Nov. 24, 1959  J. G. RUCKELSHAUS ET AL  2,914,428
FORMATION OF HARD METALLIC FILMS
Filed Nov. 9, 1953

INVENTORS
JOHN G. RUCKELSHAUS
ROLAND D. EATON
BY
ATTORNEY

United States Patent Office 2,914,428
Patented Nov. 24, 1959

2,914,428

FORMATION OF HARD METALLIC FILMS

John G. Ruckelshaus, Madison, and Roland D. Eaton, Radburn, N.J.; said Eaton assignor to said Ruckelshaus Application November 9, 1953, Serial No. 390,867

7 Claims. (Cl. 117—217)

This invention relates to the formation of hard metallic films and more particularly to an alloy resistance element and the method of making the same. Also, the invention relates to the making of "hard films" or films that are bonded so well to a glazed ceramic or glass that they resist abrasion of sliding contacts.

This application is an improvement of J. G. Ruckelshaus' copending applications Serial No. 292,367, filed June 7, 1952, and Serial No. 350,154, filed April 21, 1953.

In said first filed copending application, J. G. Ruckelshaus sets forth how a cylindrical dielectric member is coated in vacuo with a metal film, the amount of film being deposited depending on the temperature of the filament, the time of heating and the vapor pressure.

In the second filed copending application, he describes how a nonconductor or high dielectric base, carrier or plate of any suitable design is treated under high vacuum in the order of $10^{-5}$ to about $2 \times 10^{-5}$ mm. of mercury and between 350–500° C. for a suitable period of time. Furthermore, he describes how the evaporation or sublimation of metal onto the body member can be varied to produce a desired type of film coated on a dielectric plate and how the resultant plate and film are subsequently heat treated.

The present application is an improvement of these methods and uses new techniques that we have invented thereby resulting in obtaining a much "harder film." It was shown in the previous applications that it was not necessary to melt a metal alloy of nickel and chromium to get enough metallic vapor to deposit on the side walls of a glazed ceramic carrier. In fact, temperatures ranging between 100 to 400° C. but will still below the melting point of the alloy give off metallic vapor and have been shown to give a metallic film. However, this film may be put onto a cold surface and shows little tendency to stick or adhere. Subliming the same film onto a hot surface, 100 to 200° C., slightly improves its adhesion. The results of chemical action causing a good bond and enhancing the same is a further improvement of this invention. In connection with the copending applications, J. G. Ruckelshaus has utilized the terms "lighted," "heated," "sublimated," and "evaporated" interchangeably in describing his invention. In order to clarify any questions arising as a result of such interchangeable use of terms, it is to be understood that they refer more appropriately to sublimation. By evaporation is meant the change from a liquid to a vapor state at a high or at a normal temperature whereas, by sublimation, is meant the direct passage of the filament or wire from the solid to the gaseous or vapor state and back to a solid state without passing through a liquid state. This is what occurs in our invention as covered in J. G. Ruckelshaus' copending applications.

The results of a diffusion action of gas; preferably oxygen diffusing through a hot glass surface was found to control the chemical action causing the amount of bonding agent, chrome oxide, desired to hold or adhere the alloy film. The diffusion action is controlled by the film thickness as well as the temperature reached during the deposition process.

It is an object of our invention to produce a device having a durable tenacious bond, thin, film embedded in a carrier in such a manner that mechanically it will resist abrasion sufficiently to withstand the sliding action of, for example, potentiometer arms.

Another object of this invention is to obtain a highly stable resistance element having good electrical characteristics; specifically, a low temperature coefficient or little change in electrical resistance for a wide range in temperature and still retain good bonding needed for potentiometer slide arm action.

An oxygen "sink" or reservoir was created at atmospheric pressure behind the glaze or in the ceramic for the purpose of obtaining diffusion pressure in vacuo. The amount of oxygen in this sink, in respect to concentration, was found to limit or make available for chemical reaction a portion needed for more or less film hardness. This is one of the major features of improvement of this invention. By suitable mixing valves, a gas mixture of nitrogen and oxygen from 1% to 100% oxygen may be attained. This mixture is applied during the glazing process of the ceramic. The same mixture can be applied during the backing process needed for forming or coating the silver terminals. According to this invention predetermined amounts of oxygen are applied at atmospheric pressure to the ceramic and spaces within the ceramic so that when the unit is placed in vacuo predetermined concentrations of oxygen are allowed to diffuse through the glaze while the nickel chromium vapor is striking the glaze. The slower the evaporation the harder the film; or in other words, the more oxygen is diffused per unit of time at a given temperature. The thinner the glaze or glass on the ceramic, the faster the oxygen gets through the glass. The optimum thickness has been found to be from 0.0005″ to 0.002″ although a thickness up to 0.015″ has produced good results in certain instances. For contact sliders glazes measuring 0.005″ in thickness have shown extremely good "hardness."

Heretofore, thin metallic films could be formed on dielectric carriers by thermal evaporation of the metal to be deposited by allowing the vapors of the metal to condense on a relatively smooth surface of the carrier. Such alloys as "Nichrome" or nickel chromium alloys, "Constantan," "Inconel," nickel copper, and beryllium copper alloys are used in wire form. The alloy wire to be evaporated is placed onto a tungsten filament and the temperature of the filament is raised to a certain temperature where the alloy wire melts then gives off vapor.

It has been found that in accordance with our invention, it is unnecessary to melt the alloy but instead to sublime the alloys at least 100° C. under the melting point was sufficient to get the required metallic vapor pressure for deposition onto the carrier.

Furthermore, we have found that the use of tungsten filaments can be eliminated. In fact, we have found that a nickel-chromium filament or wire may be used up to fifty or more times for coating a suitably prepared carrier, without any noticeable change in the temperature characteristics, such as temperature coefficient or stability characteristics. In other methods, such as indicated in Weber's Patent 2,586,752, alloys melted onto tungsten filaments are good for only one to three evaporations. Tungsten amalgamation, embrittlement and alloying with the nichrome alloys takes place with the result that the tungsten may be evaporated onto the glass. By our method, we eliminate the use of tungsten which is excellent from the economic and production viewpoint as well as the elimination of tungsten vapor contamination.

According to this invention the chemical bonding agent is chromic oxide. This oxide is formed when the hot metallic alloy vapor strikes the glaze. The glaze temperature, especially at the surface is high and found to be about at the softening point of the glaze. The heat action releases $O_2$ and $CO_2$ from the glaze and causes the oxygen in the "sink" region to go up in pressure and diffuse very rapidly through the glass. The chrome oxide formed is readily dissolved into the glass. This is the bonding agent. The finished deposited resistor film has gradations of chrome oxide both in the glaze or glass as well as in the metals on the surface.

In addition, we have found that by our method the amount of nickel or chromium or nickel chromium alloy can be controlled by controlling the temperature. The vapor pressure of chromium was found to be 60 mm. mercury pressure as against that of nickel at its melting point which is 20 mm. We may vary this ratio by varying the temperature, this factor controlling the ratio of metals of the resultant film on the carrier plate.

Another feature of this invention is to stabilize the degree of chrome oxide to pure chromium and pure nickel metal on the surface. This is done by a prolonged baking treatment in air or pure oxygen. In this manner incomplete oxidation reactions are continued outside the vacuum, or at atmospheric pressure. This heat treatment may be as long as 200 hours or as short as 5 hours depending upon time, temperature, and the amount of oxygen in the atmosphere. Heat treatment time may be further reduced by using high pressures and pure oxygen.

Another feature of this invention is to restrict oxygen absorbers in the nickel-chromium filament alloy used for deposition of the alloy. For instance, it was found that above concentrations of 0.2% aluminum tended to reduce the hardness. Aluminum readily forms an aluminum oxide which does not dissolve in the glass. Zirconium also reduces hardness by forming zirconium oxide. These oxidizers do not dissolve into the glass and therefore take up space on the outside of the glaze surface as well as cause spots which poison or prevent chrome oxide from going into the glass where they exist.

Another feature of this invention is to restrict oxygen absorbers in the ceramic and glaze onto which the alloy film is deposited. For instance, Zirconite, a type of zirconium oxide ceramic, restricts the forming of a "hard film." Using the same type of glaze onto this material, films would stick but could be rubbed off with a pencil eraser. The bonding agent chrome oxide was limited or restricted in the forming process. There was some bonding action due to the oxygen within the glaze alone but no action due to the gas space within the ceramic acting as a "sink" or reservoir.

Another feature of this invention is to add to the type of ceramic materials either gases or chemicals which can be made to release oxygen under heat action. An example of this would be oxygen and nitrous oxide.

Another feature of this invention is to avoid inhibitors such as water, hydrogen, and organic compounds, $CCl_4$, acetone, alcohols, amyl acetate, etc., which leave residues on the glass surface. These compounds restrict or poison the surface in respect to forming chromic oxide.

Another feature of this invention is to pre-bake glazed ceramics or glass to get rid of water vapor, surface gas ($CO_2$) and organic gases, e.g., methane, alcohols, and waxes. The purpose of this is to free the surface from "poison spots" which inhibit chromic oxide from dissolving and diffusing into the glass.

Another feature of this invention is the formation of a nickel oxide. This material is only slightly soluble in glass and acts also as a bonding agent but not as great as chromium.

Another feature of this invention is the fact that on thin glazes, the glass being melted into the pores of the ceramic acts as a mechanical lock to hold the glaze onto the ceramic, the chrome oxide dissolves deeply into these pores and has an additional bonding power, using the mechanical locking action of the ceramic and at the same time a chromic oxide diffusing into the glass. It is a two way process; the oxygen diffusing outward toward the surface of the glaze upon which the film is being deposited, and the chromic oxide being dissolved into the glass. It was found that the chromic oxide glass region has electrical resistance. Normally chromic oxide is a good nonconductor. This fact means that the chrome oxide is carrying with it some of the metallic alloy. This may be considered as analogous to the wet steam process, where a dry molecule of steam carries another molecule of water along with it. Thus, a still, using wet steam, is useless for making distilled water as exactly the same water is obtained at both ends of the still. The similarity to this is that chromic oxide is dragging a molecule of alloy into the glass. Thus the chromic oxide and nickel-chromium alloy are in the glass and were found by their electrical resistance. Thus for thin glazes, the glass in the pores of the ceramic would have resistance.

The same method can be applied to glass using higher surface temperatures to produce similar results. However, the film produced on glazed ceramic was found much harder than that on glass. The reason for this is that only the oxygen in the glass was used.

Other objects and features of the invention will become apparent from the following detailed description and the accompanying drawing wherein.

Figure 1:
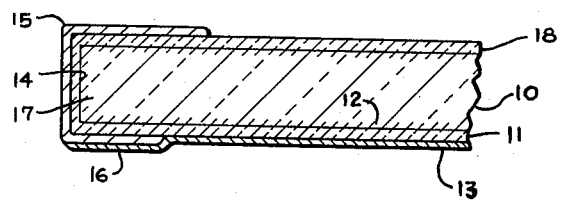
Fig. 1 is a fragmental, cross-sectional view of a carrier member such as glass or glazed ceramic representing the terminal end of a resistor.

Referring now to the drawings wherein similar reference characters designate like parts throughout a glass or glazed ceramic base, carrier or member 10 of any suitable and desirable size and thickness may be pretreated by heating the same in any type of well known oven or electric furnace to a sufficiently high temperature short of fusion to eliminate any occluded gases and to break down any unstable substances in the carrier, which substances may affect the resultant coating formed on the carrier or to glaze the same. Metallic terminals are baked onto the glazed carrier.

After this initial treatment the carrier is then placed in a bell jar or similar type of apparatus as indicated in J. G. Ruckelshaus' previously filed copending applications and then heated in vacuo with the nickel-chromium wire or filament heated to cause thermal evaporation. The temperature in the evacuated jar or similar type of apparatus is raised to between 350° C. to the melting point of the glaze. In any event it must exceed 350° C. When the hot particles of chromium (i.e., chromium vapor), hit the hot base, i.e., glass and the like, by thermal motion, oxygen is released from the base. The oxygen molecules in turn combine with the chromium vapor forming chrome oxide and chrome oxysilicate dissolving in the glass surface forming a bonding agent onto which the resultant chrome-nickel film forms. The vacuum apparatus may be equipped with a dosing system to permit the entry of oxygen into the subliming area of the filament during sublimation. The gas pressure of the oxygen is controlled for the purpose of apparently forming chrome oxysilicate and also chrome oxide, as shown, which are used as bonding agents for the thin film which will subsequently be applied. The chrome oxide and oxysilicate readily dissolve into the hot glaze 11 of the plate 10 as shown in Fig. 1. 12 represents glass penetrated into the ceramic at the boundary region while 14 represents the glaze beneath the silver terminal 15. The deposited alloy film 13 on the glazed ceramic, and 16 contacting the terminal covers ceramic 17 under the end terminal, while 18 represents the back surface of ceramic and glaze. The wall 11 represents the inner surface of the glazed carrier onto which alloy 13 is deposited.

Figure 2:
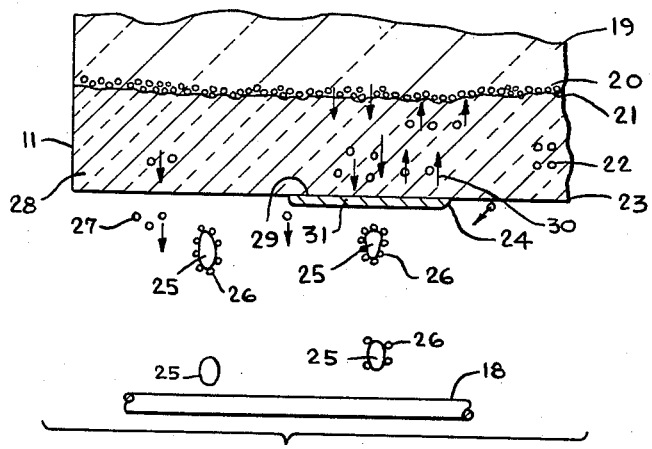
Fig. 2 is a fragmental, microscopic enlarged sectional view showing how a carrier member such as glass or glazed ceramic is treated in accordance with the invention.

In Fig. 2, we represent a microscopic section of the resistor enlarged to such a degree that various phases of the mechanism of getting a hard film may be more easily understood.

It will be noted that a nickel-chromium filament 18 is used at a temperature high enough to produce sublimation so that there is a gaseous metal vapor thermally directed toward the ceramic section 19 which contains an oxygen "sink" 20 at atmospheric pressure near the border of the glazed region. From the drawing it will be seen that there is a boundary 21 between the glaze and the ceramic, while 22 shows the oxygen molecules in the glazed body, near the surface 23 of the glass 11 onto and into which the alloy 18 is deposited. 24 is a gaseous tear drop particle which has flattened itself along the glass boundary. Number 25 represents a liquid tear drop advancing toward the glazed surface 23 and number 26 represents oxygen gas around the liquid drop collecting more and more as it approaches the surface. Number 27 shows oxygen being released from the surface during normal evacuation process, 28 the glass of the glazed ceramic and number 29 the glass directly in contact with the liquid alloy as it softens or melts releasing oxygen in the glaze as well as acting as a conductor of intense heat to the reservoir or oxygen "sink" region 20. The oxygen from 20 diffuses into the glaze 28 and forms chromic oxide 30 at glaze boundary surface 23 directly under the molten alloy 24. This chromic oxide 30 immediately dissolves into the glass. However, some of the chrome oxide 30 also dissolves in the molten alloy 24. Upon freezing, the chrome oxide crystallizes partially at the boundary 23 and tends to lock or bond the two materials together. The glass surface at the boundary 23 is only softened or melted during the instant the deposited metal is striking it. The molten alloy tear drop 25 flattens out when it strikes the glazed surface. Surface tension on the alloy drop makes it pull its surface together in the form of a sphere. Upon traveling through the vacuum space the sphere contracts and elongates from a sphere to a football in shape, the long axis parallel to the direction of flight; then back to a sphere, then back to a football with its long axis perpendicular to the direction of flight; then back to a sphere; then back to a football with its long axis parallel to direction of flight and etc. This phenomenon was photographed stroboscopically using soap bubbles. Any nickel-chromium filament deposited under high gas pressure when the surface temperature of the glass is anywhere from melting point of the glaze forms a very hard surface highly resistant to abrasion. This chrome oxide in the glaze varies in mass density per unit depth.

The $O_2$ and $CO_2$ content of the glaze during deposition of the nickel-chromium filament can be controlled by regulating the temperature, pressure and time of processing. For example, hot metallic vapor striking the section 19 causes it to out-gas or give up the $O_2$ and $CO_2$, the latter decomposing into C and $O_2$ while the $O_2$ combines with the chromium vapor and redissolves into the glass forming the bonding agent. Also this chromium oxide layer acts as a barrier 13 between the glass and the metallic film resulting on the carrier.

The thickness of this barrier layer of chrome oxide with respect to the nickel chrome metal deposited on top of it is controlled to such a degree that very low temperature coefficient of the resultant resistances are obtained.

The temperature coefficient is controlled by varying the ratio of the gas forming the chrome oxide barrier layer to the subliming temperature of the chrome-nickel filament.

In using alloy wires, it is important that the nickel-chrome alloy be pure and that all traces of aluminum and iron be eliminated. The aluminum forms aluminum oxide and robs the chrome of its oxidation reducing its bonding power. By controlling the ratio of the nickel to the chromium in original wire used for sublimation, the amount of vapor of these two metals or compounds may be more easily controlled. It was also noted that metal aluminum alloys cause high temperature coefficients as well as poor bonding. For example, an alloy with less than 0.2% aluminum was found to give the lowest temperature coefficient. The aluminum impurity is removed from the nickel chrome alloy so that the resultant chrome nickel film 13 is very hard.

As to the sublimation time of the filament, this is independent of the temperature coefficient. On large surfaces where uniformity is required and filament distances of 4 to 6" to the deposition surface may be deposited in an hour to two or more hours according to the resistance desired without any change in the temperature coefficient or in stability characteristics of the film.

After the film has been formed the resistor is stabilized by adding oxygen to the evaporated film either before or after it has been removed from the evacuating chamber. Outside the vacuum chamber heat treating is done by holding the resistor at a temperature, for example, of 140% C. for at least 100 hours or at higher temperatures for less time, e.g., at 160° C. for 60 hours, at 180° C. for 1 to 5 hours. By this heat treatment the resistor is stabilized and drift in resistance is minimized. Furthermore, the resistance units may be more easily stabilized by heat treating them in a bomb or sealed unit at 1000–3000 lbs. pressure at 140–150° C. for a period of several minutes not exceeding 30 minutes.

Figure 3:
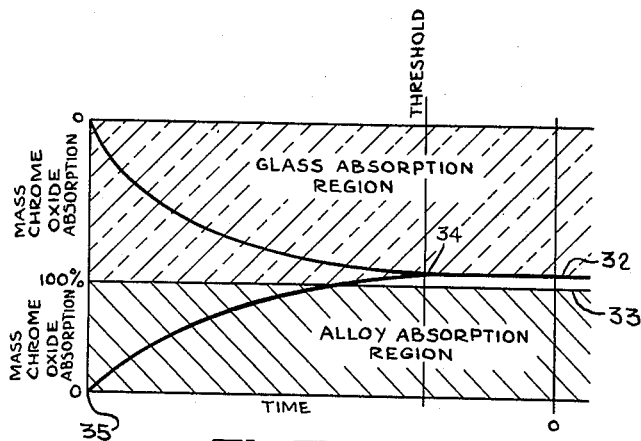
Fig. 3 is a graph representing the amount of chrome oxide mass per unit volume dissolving into a definite thickness of glass or a thin thickness of alloy film.

In Fig. 3, the curves represent the amount of chrome oxide mass per unit volume dissolving into a definite thickness of glass or a thin thickness of alloy film. These curves are directly related to the bonding action of the chrome oxide in the glass to the metallic alloy film. These curves represent the amount of diffusion of chromic oxide into glass for a very short period of time during sublimation while the alloy and glass are in the absorption state. The axis 33 represents the boundary of the glass to alloy surface, while 34 represents a point in a thick piece of glass where no more chrome oxide is absorbed. Number 35 represents a point in the alloy film where no more chrome oxide is dissolved into the alloy film, while point 32 was found experimentally by removing all the metallic alloy off the glass surface and the glass was found to be slightly conducting. Chromic oxide is an excellent insulator and is absorbed into glass quite easily when the glass is red hot. Under these conditions the glass was still a good insulator. However, the glass was found to be conducting in the megohm region. This means that the chromic oxide drags a molecule of alloy along with it when it diffuses into the glass. This explains why some alloy vapor was carried directly into the glass. This feature aids in the bonding action of the metal alloy film to the glass and is one of the means of making a "hard film" as per this invention. Excessive heating and slow sublimation has shown a light straw color on films deposited onto glass. Normally chrome oxide is green but the amount of color depends on the amount of chrome oxide present. The amount of color varies according to the film thickness shown by interference. Excessive baking produces the chrome green.

Experience has shown that resistors taken directly from the evaporation chamber are unstable and show high temperature coefficients and high "drift." By high "drift" is meant not returning to the same resistance value at room temperature after it has been heat cycled. This means that the chrome oxidation process in the film and the glass was incomplete. By heat treating in air for about a hundred hours they were found to become stabilized.

From the foregoing, it will be noted that the control of the temperature coefficient is based upon the ratio of chromic oxide and chrome nickel alloy and the ratio of chrome to nickel in the film deposited on the chromic oxide or possibly the chrome oxysilicate which are all fused or dissolved into the body of the plate or member.

The metallic film formed or fused into the body member may vary in thickness between 50 to 200 microns.

While a preferred embodiment of the invention has been described and illustrated, it is to be understood that modifications as to arrangement and use of parts and the operation of the method herein may be made without departing from the spirit and scope of the invention as claimed.

We claim:

1. A method of manufacturing alloy resistance films to make a "hard film" bonded by metallic oxides of that film in and on a glazed ceramic that they resist abrasion of sliding contacts, comprising subliming in a vacuum said film at a temperature at least from 100° C. below the melting point of the alloy, said alloy vapor striking the glazed ceramic whose surface temperature during the deposition process is in excess of 350° C. to the melting point of the glass, and during said sublimation forming metal alloy oxides thereon, said alloy oxides being selected from the group consisting of nickel oxide and chrome oxide, using a nickel chromium alloy filament having less than 0.2% aluminum, then bonding said ceramic surface with alloy film, said ceramic having been preheated to cause it to absorb oxygen which, under the heat of evaporation, diffuses through the glass to form oxides of the alloy vapor which in turn dissolve into the glass and the alloy film.

2. The method of manufacturing a glazed ceramic resistor having an alloy metal resistance film thereon to make a hard film that is bonded by metallic oxides of that film in the glazed ceramic material forming said resistor whereby said film resists abrasion of sliding contacts, comprising subliming a nickel chromium alloy while under high vacuum conditions at an alloy temperature of at least 100° C. below the melting point of the alloy, whereby the resultant alloy vapor strikes a surface of the glazed ceramic while the surface temperature of the ceramic during the deposition of the alloy vapors exceeds 350° C., forming during the sublimation of the alloy, nickel oxide and chrome oxide to diffuse said oxides into the glazed ceramic from the nickel chromium alloy filament.

3. In the manufacture of alloy resistance elements, the steps comprising heating a dielectric member selected from the ground consisting of glass, ceramic, porcelain and alundum to a temperature exceeding 350° C. in an enclosed space in which the pressure is less than the order of $10^{-5}$ mm. of mercury thereby effecting escape of oxygen from the surface, simultaneously heating an alloy wire by the direct passage of electric current therethrough, and to a temperature in excess of 350° C., said wire being selected from the group consisting of the alloy metals, nickel chromium, nickel copper, copper beryllium, attaining a high vapor pressure of said wire, effecting the formation of an oxide of metal from said group when coming into contact with said glazed surface from which oxygen escapes, then coating the glazed surface with the components of the alloy to be used as a resistance, stabilizing the resistance by contacting said film with an oxidizing gas while said film is heated.

4. The method according to claim 3 wherein the temperature in excess of 350° C. of the alloy wire is elevated to produce a ratio of different component metal vapors of the wire to make up a film having a desired and predetermined temperature coefficient.

5. The method of producing a metallic film on a dielectric member selected from the group consisting of glass, ceramic, porcelain and alundum, comprising heat treating said member, placing a filament consisting of a metal to be sublimed adjacent the member in a closed system, reducing the atmospheric pressure surrounding the member and filament, directly heating the filament while the pressure is reduced in the area of $10^{-4}$ mm. of mercury at a temperature of about 400° C., maintaining such heating and continuing the reduction of pressure, then passing an electric current directly through the filament to heat the same to a temperature below the sublimation point of the filament, maintaining the heat on said filament, increasing the flow of current through the filament to raise the temperature thereof above the sublimation point, reducing the heat to resume room temperature of the filament and the member while maintaining a pressure of $10^{-5}$ mm. of mercury in vacuo then removing the coated member at room temperature and finally annealing.

6. The method according to claim 5 including stabilizing the ohmic value of the resultant resistor by heating the same to a temperature of at least 180° C. for one to five hours.

7. A resistance element made according to the method of claim 3, said element comprising a glazed dielectric member selected from the group consisting of glass, ceramic, porcelain, and alundum, said element having a subsurface on which there is dissolved throughout the subsurface a mixture of an oxide and oxysilicate of a metal, said element further having a surface to which is bonded a film of a metal selected from the group consisting of the metals nickel, chromium and an alloy of nickel and chromium, of nickel copper and copper beryllium, said film permeating the surface into the subsurface area of said member.

References Cited in the file of this patent

UNITED STATES PATENTS

| 2,119,989 | Higgens | June 7, 1938 |
| 2,264,152 | Rowland | Nov. 25, 1941 |
| 2,440,691 | Jira | May 4, 1948 |
| 2,496,346 | Haayman et al. | Feb. 7, 1950 |
| 2,501,563 | Colbert et al. | Mar. 21, 1950 |
| 2,586,752 | Weber et al. | Feb. 19, 1952 |
| 2,628,299 | Gaiser | Feb. 10, 1953 |
| 2,730,598 | Lytle | Jan. 10, 1956 |
| 2,793,143 | Kohring | May 21, 1957 |